(12) United States Patent
Taylor

(10) Patent No.: US 7,094,988 B1
(45) Date of Patent: Aug. 22, 2006

(54) LASER WELDING HEAT TREAT PROCESS

(75) Inventor: Clyde R. Taylor, Laurens, SC (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 11/109,129

(22) Filed: Apr. 18, 2005

(51) Int. Cl.
*B23K 26/24* (2006.01)

(52) U.S. Cl. .............................. 219/121.64; 219/121.61

(58) Field of Classification Search ............ 219/121.61, 219/121.63, 121.64; 148/525
See application file for complete search history.

(56) References Cited

U.S. PATENT DOCUMENTS

| | | | |
|---|---|---|---|
| 3,622,743 A | | 11/1971 | Muncheryan |
| 4,000,392 A | | 12/1976 | Banas et al. |
| 4,564,736 A | * | 1/1986 | Jones et al. ............ 219/121.63 |
| 4,644,127 A | | 2/1987 | La Rocca |
| 4,757,179 A | | 7/1988 | Matrisian et al. |
| 4,804,815 A | | 2/1989 | Everett |
| 4,827,099 A | * | 5/1989 | Krebs et al. ............ 219/121.63 |
| 5,038,016 A | | 8/1991 | Robertson et al. |
| 5,106,010 A | | 4/1992 | Stueber et al. |
| 5,374,319 A | | 12/1994 | Stueber et al. |
| 5,478,983 A | | 12/1995 | Rancourt |
| 5,622,638 A | | 4/1997 | Schell et al. |
| 5,795,412 A | | 8/1998 | Delmaire |
| 5,795,541 A | | 8/1998 | Tanigawa et al. |
| 5,814,784 A | | 9/1998 | Kinsman et al. |
| 5,900,170 A | | 5/1999 | Marcin, Jr. et al. |
| 5,914,059 A | | 6/1999 | Marcin, Jr. et al. |
| 6,054,672 A | | 4/2000 | Foster et al. |
| 6,054,687 A | | 4/2000 | Conner et al. |
| 6,332,272 B1 | | 12/2001 | Sinnott et al. |
| 6,333,484 B1 | | 12/2001 | Foster et al. |
| 6,444,947 B1 | | 9/2002 | Bonss et al. |
| 6,495,793 B1 | | 12/2002 | Tewari |
| 6,640,604 B1 | | 11/2003 | Matsushita |
| 6,744,007 B1 | | 6/2004 | Ono et al. |
| 6,914,213 B1 | * | 7/2005 | Alips et al. ............ 219/121.64 |
| 2002/0098298 A1 | | 7/2002 | Bolton et al. |
| 2003/0173344 A1 | | 9/2003 | Hermann |
| 2004/0188394 A1 | | 9/2004 | Becker et al. |
| 2005/0028897 A1 | * | 2/2005 | Kurz et al. ................ 148/525 |

FOREIGN PATENT DOCUMENTS

| | | | |
|---|---|---|---|
| JP | 60-121093 A | * | 6/1985 |
| JP | 8-332582 A | * | 12/1996 |
| JP | 2003-290952 A | * | 10/2003 |

* cited by examiner

*Primary Examiner*—Geoffrey S. Evans
(74) *Attorney, Agent, or Firm*—Ingrassia Fisher & Lorenz

(57) ABSTRACT

A method for providing a pre-welding heat treatment to a workpiece surface is described wherein the method includes the steps of: generating through a laser generator a laser beam characterized by a power and focal point; positioning the laser generator such that the focal point of the laser beam is above the workpiece surface so as to generate a defocused laser beam; directing the defocused laser beam toward the workpiece surface so as to project a laser beam spot on the workpiece surface; scanning the laser beam spot over the workpiece surface thereby heating the workpiece surface so as to provide a pre-welding heat treatment; repositioning the laser generator such that the focal point of the laser beam is changed; and laser welding the workpiece with substantially the same power as in the generating step. The method is further adapted for use with a hand held Nd:YAG laser torch, and the workpiece may be a superalloy gas turbine engine component.

16 Claims, 5 Drawing Sheets

LASER WELDING HEAT TREAT PROCESS

FIELD OF THE INVENTION

The present invention relates to laser powder fusion welding of metallic materials. More particularly the invention relates to pre-welding and post-welding heat treatments to a superalloy workpiece using a hand-held laser welding torch.

BACKGROUND OF THE INVENTION

In an attempt to increase the efficiencies and performance of contemporary gas turbine engines, engineers have progressively pushed the engine environment to more extreme operating conditions. The harsh operating conditions of high temperature and pressure that are now frequently specified place increased demands on engine components and materials. Indeed the gradual improvement in engine design has come about in part due to the increased strength and durability of new materials that can withstand the operating conditions present in the modern gas turbine engines. With these changes in engine materials, there has arisen a corresponding need to develop new repair methods appropriate for such materials.

Components used in modern gas turbine engines are frequently castings from a class of materials known as superalloys. The superalloys include nickel-based, cobalt-based and iron-based superalloys. In the cast form, components made from advanced superalloys include many desirable properties such as high elevated-temperature strength and good environment resistance. Advantageously, the strength displayed by this material remains present even under stressful conditions, such as high temperature and high pressure, experienced during engine operation.

Disadvantageously, the superalloys generally are very difficult to weld successfully. Traditional repair methods have proven less than satisfactory for superalloy materials. During a high temperature welding for example, a superalloy component may experience severe heat stress and cracking, giving the component undesired properties for further engine service. Hence, it is desirable to find a repair method suitable for use with superalloys that does not subject the workpiece matrix to heat-induced damage.

Heating a component in pre-welding and post-welding steps with known devices such as induction heaters, quartz lamps, and heating blankets is also disadvantageous. These items are time consuming and difficult to deploy on a workpiece. Certain workpiece geometries are not suited to the use of such heating methods. Further, it is difficult to control and direct the heat generated by these devices.

The option of throwing out worn turbine engine components and replacing them with new ones is not an attractive alternative. Superalloy components can be expensive due to costly materials and manufacturing processes. For example, a high pressure turbine blade made of a superalloy can be quite costly to replace, and a single stage in a gas turbine engine may contain several dozen such blades. Moreover, a typical gas turbine engine can have multiple rows or stages of turbine blades. Consequently there is a strong financial need to find an acceptable repair method for superalloy turbine blades and vanes.

Hence, there is an ongoing need to identify improved repair methods for gas turbine engine superalloy components that address one or more of the above-noted drawbacks. Namely, a repair method is needed that can weld superalloy components while avoiding heat induced cracking. Further a repair method is needed that can efficiently and effectively heat a workpiece in pre-welding and post-welding operations. Further, a repair method is needed that by virtue of the foregoing is therefore less costly as compared to the alternative of replacing worn parts with new ones. The present invention addresses one or more of these needs.

SUMMARY OF THE INVENTION

The present invention provides a method for repairing gas turbine engine components comprising superalloy materials. In one embodiment, and by way of example only, there is provided a method for providing a pre-welding heat treatment to a workpiece surface comprising the steps of: generating through a laser generator a laser beam characterized by a power and focal point; positioning the laser generator such that the focal point of the laser beam is above the workpiece surface so as to generate a defocused laser beam; directing the defocused laser beam toward the workpiece surface so as to project a laser beam spot on the workpiece surface; scanning the laser beam spot over the workpiece surface thereby heating the workpiece surface so as to provide a pre-welding heat treatment; repositioning the laser generator such that the focal point of the laser beam is changed; and laser welding the workpiece with substantially the same power as in the generating step. The workpiece may further include a crack having an edge such the step of scanning the laser beam spot further comprises moving the laser beam spot along a weld crack on the surface of the workpiece such that a circumference of the laser beam spot tangentially touches the weld crack. The workpiece may further include a workpiece crack having a centerline, and the laser beam spot may be further characterized as having a diameter and a centerpoint such that the step of scanning the laser beam spot further comprises moving the laser beam spot such that the centerpoint of the laser beam spot is within a distance normal to the centerline of the workpiece of approximately the laser beam spot diameter. The workpiece may further be characterized as having a surface of a heat affected zone such that the step of scanning further comprises scanning the laser beam spot over the surface of the heat affected zone. The step of scanning may further comprise scanning the laser beam spot over the workpiece surface thereby heating the workpiece surface to a temperature of between about 1600° F. to about 2000° F. The step of scanning may further comprise scanning the laser beam spot over the workpiece surface for up to approximately 2 minutes. The method may further include the step of providing a workpiece having a workpiece surface wherein the workpiece comprises a superalloy. The laser generator may comprise a hand held Nd:YAG laser torch.

In a further embodiment, and still by way of example, there is provided a method of providing a post-welding heat treatment to a workpiece having a weld, the method comprising the steps of: laser welding a workpiece surface with a laser beam characterized by a power and focal point so as to develop a weld, wherein the laser beam is controlled by a laser generator; positioning the laser generator such that the focal point of the laser beam is above the workpiece surface thereby developing a defocused laser beam; directing the defocused laser beam toward the workpiece surface so as to project a laser beam spot on the workpiece surface; scanning the laser beam spot over the weld of the workpiece surface so as to provide a post-welding heat treatment; and reducing the power of the laser beam. The weld may be characterized as having a centerline and the laser beam spot may be characterized as having a centerpoint such that the step of scanning the laser beam spot over the weld of the workpiece surface further comprises moving the defocused laser beam spot such that the center point of the laser beam spot follows the centerline of the weld. The weld may be characterized as having an edge and the laser beam spot may be characterized as having a centerpoint such that the step of scanning the laser beam spot over the weld of the workpiece surface further comprises moving the defocused laser beam spot such that the centerpoint of the laser beam spot follows the edge of the weld. The step of reducing the power of the laser beam may further comprise reducing the power of the laser beam from approximately 700 watts or less to approximately 0 in approximately 5 minutes or less. The step of reducing the power of the laser beam may further comprise reducing the power of the laser beam from approximately 400 watts or less to approximately 0 in approximately 5 minutes or less. The laser generator may comprise a hand held Nd:YAG laser torch.

In still a further embodiment, and still by way of example, there is provided a method of laser welding a workpiece surface comprising the steps of: generating through a laser generator a laser beam having a focal point; positioning the laser generator such that the focal point of the laser beam is above the workpiece surface thereby developing a defocused laser beam; directing the defocused laser beam toward the workpiece surface so as to project a laser beam spot on the workpiece surface; scanning the laser beam spot over the workpiece surface thereby heating the workpiece surface; adjusting the laser generator so as to move the focal point of the laser beam closer to the workpiece surface; laser welding the workpiece so as to develop a weld; repositioning the laser generator so as to move the focal point of the laser beam farther from the workpiece surface thereby developing a defocused laser beam; directing the defocused laser beam toward the workpiece surface so as to project a laser beam spot on the workpiece surface; scanning the laser beam spot over the weld; and reducing the power of the laser beam while scanning the laser beam spot over the weld. The step of generating through a laser generator a laser beam may further comprise generating through a laser generator a laser beam characterized by a power, and the step of laser welding may further comprise laser welding with a laser beam characterized by a power, wherein the power of the laser beam in the generating step is substantially the same power of the laser beam as used in the laser welding step. The step of generating through a laser generator a laser beam may further comprise generating through a laser generator a laser beam characterized by a power of between about 75 watts to about 400 watts. The method may further comprise the step of providing a workpiece having a workpiece surface wherein the workpiece comprises a superalloy. The method may further comprise monitoring the temperature of the workpiece surface through a pyrometer. The laser generator may comprise a hand held Nd:YAG laser torch.

Other independent features and advantages of the laser welding heat treat process will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention. Reference will now be made in detail to exemplary embodiments of the invention, examples of which are illustrated in the accompanying drawings. Wherever possible, the same reference numbers will be used throughout the drawings to refer to the same or like parts.

Figure 1:
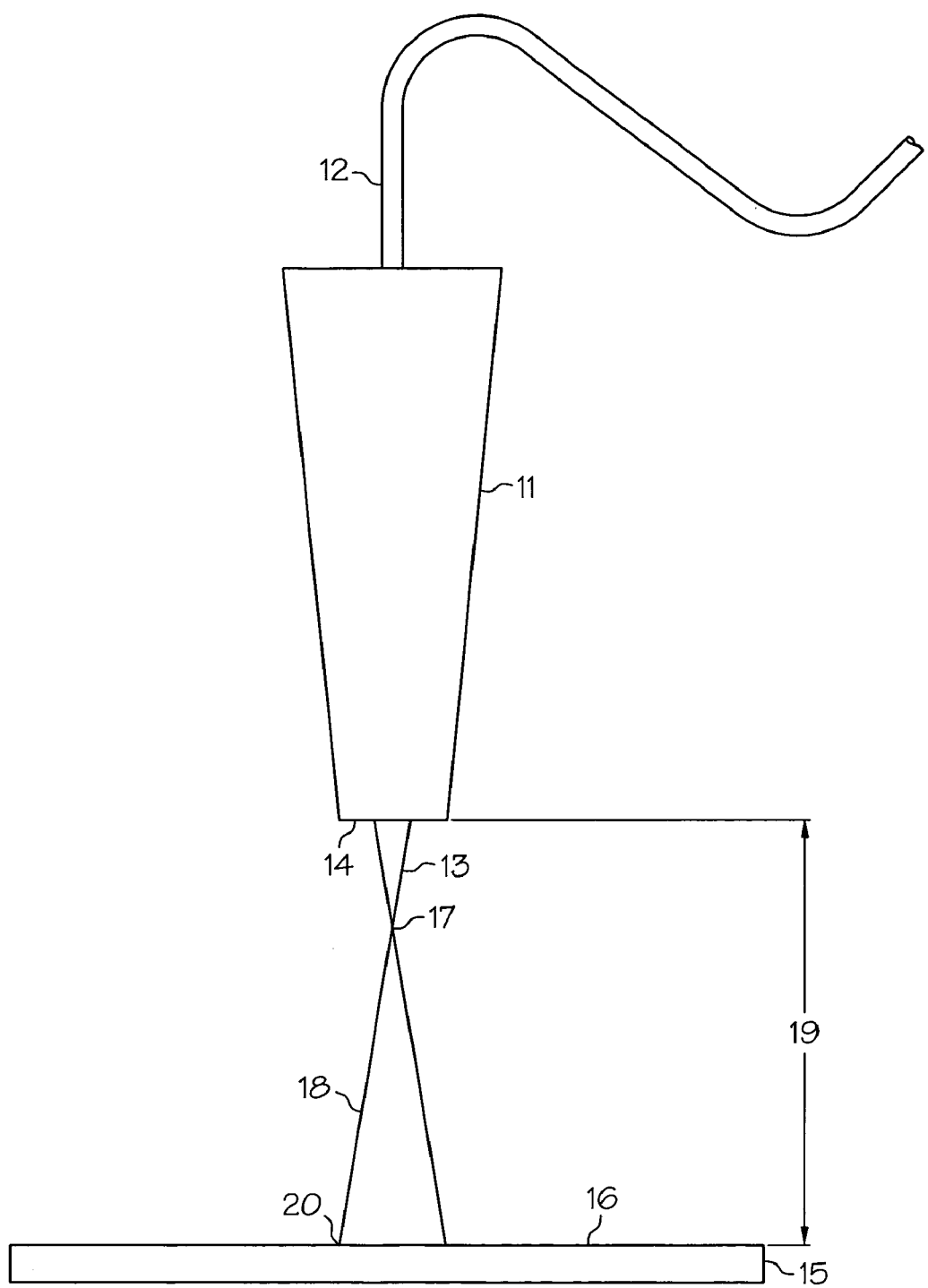
FIG. 1. is a side view representation of a laser welding torch projecting a defocused laser beam on a surface of a workpiece according to an embodiment of the invention.

Referring now to FIG. 1 there is illustrated a laser torch 11 projecting a laser beam 13 that is useful for heat treating according to an embodiment of the present invention. The heat treating method utilizes a laser torch 11, preferably a hand held torch for use with laser powder fusion welding. As will be understood by those skilled in the art, laser torch 11 is represented in FIG. 1 in simplified form. Related systems in a laser generator such as power, blanketing gas, powder feed (or wire feed), and laser optics are not shown in detail in this figure. A suitable conduit 12 such as a fiber optic cable delivers laser energy to laser torch 11. A laser beam 13 exits nozzle tip 14 of torch 11. The laser beam 13 is directed toward workpiece 15 having a surface 16. It is noted that laser beam 13 is directed such that it is generally normal to surface 16 respective to an imaginary center line of laser beam 13. While this orientation of laser beam 13 is preferred, other angled configurations are possible. Laser torch 11 is also directed such that nozzle tip 14 is at height 19 from surface 16 of the workpiece 15.

FIG. 1 illustrates that as laser beam 13 exits nozzle tip 14 laser beam converges to focal point 17. It is noted that setting nozzle tip 14 at height 19 also positions focal point 17 relative to surface 16, for a given laser focus. As laser beam 13 continues past focal point 17, toward surface 16, it transitions into defocused laser beam 18. Defocused laser beam 18 is that portion of the laser beam 13 wherein light energy is diverging as it moves farther away from focal point 17. Defocused laser beam 18 impinges on surface 16 at laser beam spot 20. Though not fully shown in FIG. 1, laser beam spot 20 is generally circular as projected onto surface 16, assuming a normal relation between laser beam 13 and surface 16. As height 19 is increased, the diameter of laser beam spot 20 grows larger. Conversely, as height 19 is decreased, the diameter of laser beam spot 20 also decreases until focal point 17 is in contact with surface 16.

Defocused laser beam 18 conveys laser energy to surface 16. As described further herein, this energy can provide a heat treatment to surface 16 of workpiece 15. The energy may be quantified as a power density. The magnitude of the power density depends, assuming other variables are constant, on the diameter of laser beam spot 20. A relatively small diameter laser beam spot 20 receives a relatively higher power density compared to a larger diameter laser beam spot 20. Explained another way, when defocused laser beam 18 is impacting surface 16, moving laser torch 11 farther away from surface 16 reduces the laser power density on the surface 16, and moving laser torch 11 closer to the surface 16 (up to the focal point 17), increases the laser power density on the surface 16. Adjustment of the defocused laser beam 18 can thus be used to project a controlled laser heating on surface 16 by the laser torch 11.

Figure 2:
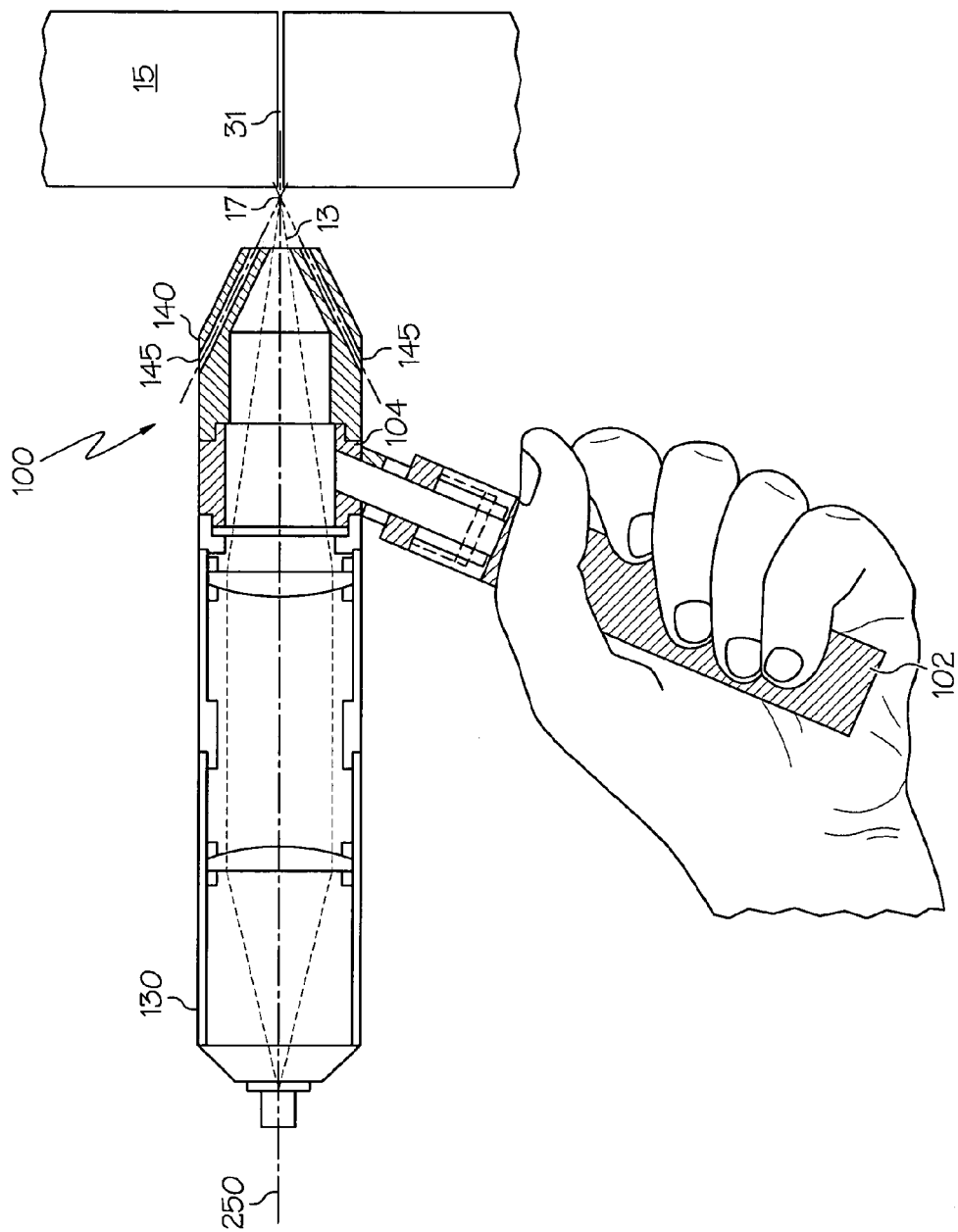
FIG. 2 is a perspective view of a hand-held, powder-fed, laser welding torch that may be used in the heat treating process according to an embodiment of the invention.

Referring now to FIG. 2 there is shown a hand-held laser torch 100 that is suitable for use with embodiments of the present invention. This welding torch 100 is more fully described in U.S. Pat. No. 6,593,540, which is commonly assigned to the assignee of the present invention, Honeywell International, Inc.; and this patent is fully incorporated herein by reference. In general, the hand-held laser torch 100 comprises an optional handle 102, to which is affixed body 104. Attached to body 104, or unitary therewith, is nozzle 140. A nozzle gas cover (not shown) may also be included with nozzle 140. Incorporated within nozzle 140 and nozzle gas cover are ancillary laser welding systems for the delivery of shielding gas and for the delivery of filler material. While these systems are not shown in full detail in FIG. 2, channels 145 are illustrated through which may flow both shielding gas and laser welding powder. Filler material may also be supplied by means such as powder feed and through a wire feeder. FIG. 2 does illustrate exemplary components of an optical beam delivery assembly 130. This assembly includes laser light 250, which may be transmitted through known means including beam guides and fiber optic lines. Laser light 250 is focused and directed through a series of lenses and/or guides. Laser beam 13 exits laser torch 100 through nozzle 140. FIG. 2 further illustrates laser beam 13 directed toward workpiece 15 with crack 31 thereon. Laser beam 13 is characterized by focal point 17 shown in FIG. 2 as above workpiece 15.

The description herein of the heat treat process uses the terms laser torch and laser generator. A laser generator is a more general term encompassing both hand held devices and a relatively stationary, fixed apparatus to develop laser beams. A laser torch, unless otherwise indicated, refers to a hand held laser generator. While a preferred embodiment of the heating method is adapted for use with a hand held laser torch, the method may also be used with fixed or automated laser generators. A YAG laser is one preferred laser type of laser generator suitable for use with embodiments of the present invention. The term YAG laser refers to an Yttrium Aluminum Garnet laser. Such lasers also may include a doping material, such as Neodymium (Nd), and such a laser is sometimes referred to as an Nd:YAG laser. The present invention may also be practiced with YAG lasers that use other dopant materials. Other laser generators that may be used include direct diode, fiber, and $CO_2$ laser generators.

Figure 3:
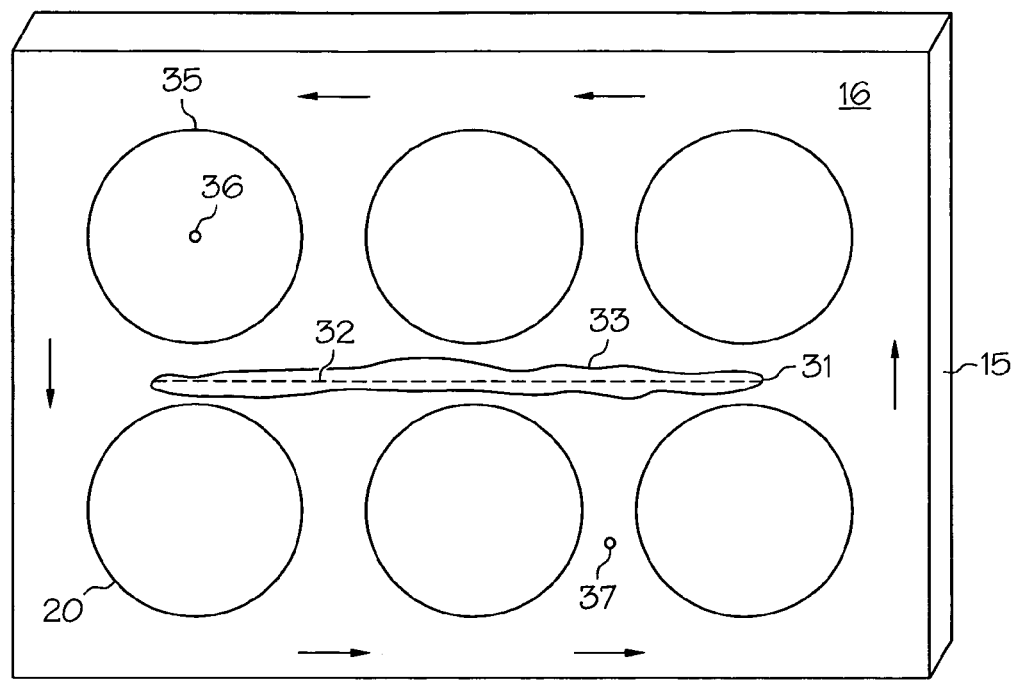
FIG. 3 is a top view showing a scan of a defocused laser beam spot around a crack in a workpiece as part of a pre-welding heating step according to an embodiment of the present invention.

Referring now to FIG. 3 there is shown a top view of a laser beam spot 20 traversing across a surface 16 of work piece 15 according to a heat treatment embodiment of the present invention. The heat treatment of FIG. 3 corresponds to a pre-welding heating. Laser beam spot 20 is projected by a defocused laser beam. In FIG. 3 a surface 16 of workpiece 15 is the plane of the page. Crack 31 is present in workpiece 15, and as is common in gas turbine engine components, crack 31 may project to a certain depth. Crack 31 may be characterized as having an imaginary centerline 32 and edge 33. The series of circles in FIG. 3 represent laser beam spot 20 as it traverses over the surface 16 of the workpiece 15. The arrows indicate a preferred direction of travel as the laser beam spot 20 scans over the surface 16. Thus, as shown in FIG. 3, laser beam spot 20 generally scans around crack 31. Other movements are possible. For example, laser beam spot 20 may be moved so as to cross over crack 31; laser beam spot 20 may be moved in a zig zag motion; and laser beam spot 20 may be reversed in direction.

An acceptable movement of laser beam spot 20 may be further described in geometric terms with respect to a circumference 35 or centerpoint 36 projected onto laser beam spot 20. For example, FIG. 3 illustrates placement of circumference 35 and centerpoint 36 by assuming that laser beam spot 20 approximates a circle. FIG. 3 illustrates that the circumference 35 of laser beam spot 20 is brought in proximity to crack 31. An acceptable operation is to bring the circumference 35 of laser beam spot 20 in proximity with crack 31 such that circumference 35 tangentially touches an edge 33 of crack 31 or such that circumference 35 is in tangential proximity to edge 33. A further acceptable operation is to project a centerline 32 through the middle of crack 31 and to move the laser beam spot 20 such that its circumference 35 is in tangential contact with the projected centerline 32 or such that circumference 35 is in tangential proximity with centerline 32. (As used herein tangential proximity means that the point on the circumference 35 closest to edge 33 (or centerline 32) is within a distance equivalent to a radius of laser beam spot 20.) As a further option, the centerpoint 36 of laser beam spot 20 may be maintained a certain distance from the centerline 32 of crack 31, or a certain distance normal from an edge 33 of crack 31. An exemplary distance that may be used is the diameter of the laser beam spot 20.

Figure 4:
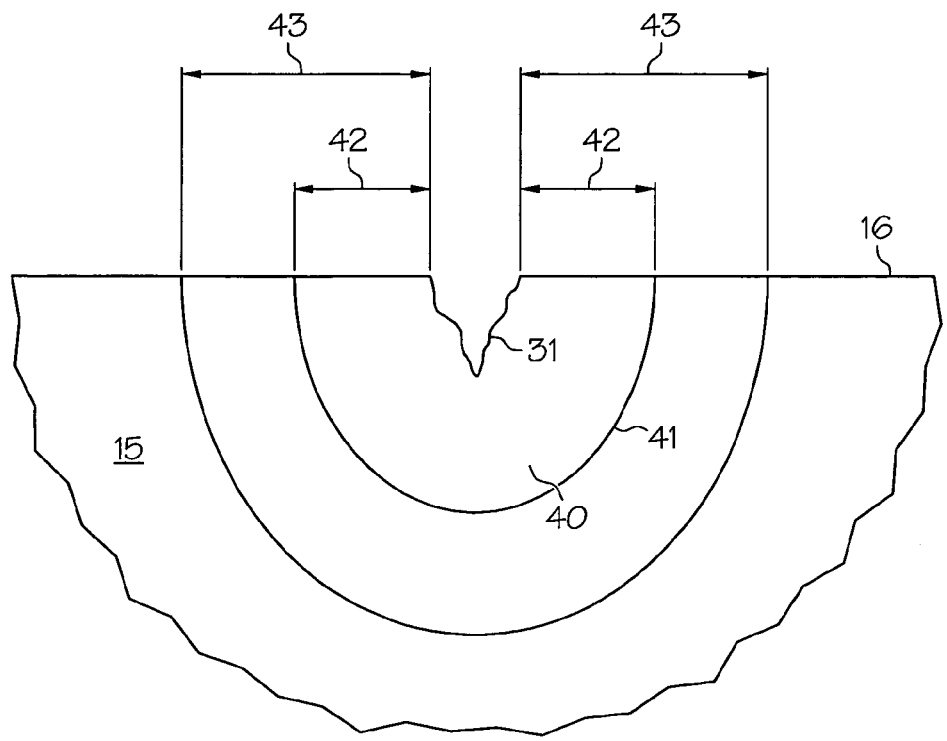
FIG. 4 is a cross-sectional view of a workpiece with a crack and a surrounding heat affected zone according to an embodiment of the present invention.

The objective in each of the above-described scanning methods is that power in the defocused laser beam provides heating that is directed to that area of workpiece 15 that surrounds the crack 31. This area is referred to herein as the potentially heat affected zone 40. Referring now to FIG. 4, there is shown a cross sectional view of a workpiece 15 with a typical crack 31 and a surrounding heat affected zone 40. A typical laser welding operation will provide filler material, such as powder or wire, to crack 31. Both the filler material and some surrounding native material of workpiece 15 may be heated so as to form a molten puddle. The intense heat involved in welding potentially stresses the heat affected zone 40 by significantly raising the temperature in this area. This heat stress can induce microcracking within the workpiece 15. A pre-welding heat treatment that preheats the workpiece 15 can help to avoid, or at least inhibit, stress in the heat affected zone 40. This heat treatment allows the workpiece 15 to gradually heat up, rather than suddenly heat up, as would typically occur during laser welding. FIG. 4 also illustrates a heat affected zone boundary 41, which represents a temperature gradient within which potential microcracking may occur. Projecting the heat affected zone boundary 41 to the surface 16 of workpiece 15 represents distance 42, which is the distance 42 from the edge 33 of crack 31 to the heat affected zone boundary 41. It is thus desired to provide a pre-welding heat treatment onto the surface 16 so as to encompass distance 42. This is accomplished, in one embodiment, by expanding the diameter of laser beam spot 20 to a pre-welding distance 43. In this manner the diameter of laser beam spot 20 is directed over, and exceeds, the pre-welding distance 43.

In a further embodiment, a temperature sensor 37 is disposed on the surface 16 of the workpiece 15 as shown in FIG. 3. An exemplary temperature sensor 37 is a pyrometer though various other temperature sensors may be used. The temperature sensor measures surface temperature. In one embodiment of heat treating a superalloy workpiece, the pre-welding heat treatment continues until the surface temperature is raised to between about 1600° F. to about 2000° F.

In the pre-welding heat treatment, it is generally desired that the temperature of the workpiece being heated not rise sufficiently so as to melt or otherwise develop a welding puddle. It is desired that the temperature of the workpiece 15 rise to some level below the temperatures that will be reached during the subsequent laser welding step. Thus, as has been explained, one way to control the power projected onto the workpiece is to position the laser torch (or laser generator) a sufficient distance away from the workpiece such that a defocused laser beam projects onto the workpiece. Other means can also be used to control the laser beam power. For example, the power of the laser beam itself can be reduced. Additionally, if the focal point of the laser beam is adjustable, the focal point can be moved. However, it has been found advantageous in manual welding operations to perform a preheating with a laser beam at approximately the same power level and focus as will be used in the subsequent welding. In this manner, there is no need after preheating to adjust the laser settings. Thus, in a preferred embodiment, the preheating is carried out with the laser torch (or laser generator) energized to approximately the same power level as that planned for welding. With respect to superalloy materials, an exemplary power level for the laser beam, for both heating and welding steps, is between approximately 75 and approximately 400 watts, though other powers (higher and lower) are possible.

It will be appreciated that a heat treatment for heating a workpiece to a target temperature can vary in time depending on the power directed onto the surface of the workpiece. Higher power density laser beams heat the workpiece more quickly, and lower power density laser beams heat more slowly. For manual operations it is desirable to minimize the time necessary for heating. With respect to superalloy materials, it is preferred to provide power such that the heat rises to between about 1600° F. and about 2000° F. in under a time of about 2 minutes. It is further preferred to control this power and temperature rise by controlling the distance 19 of the laser generator from the workpiece surface 16.

Figure 5:
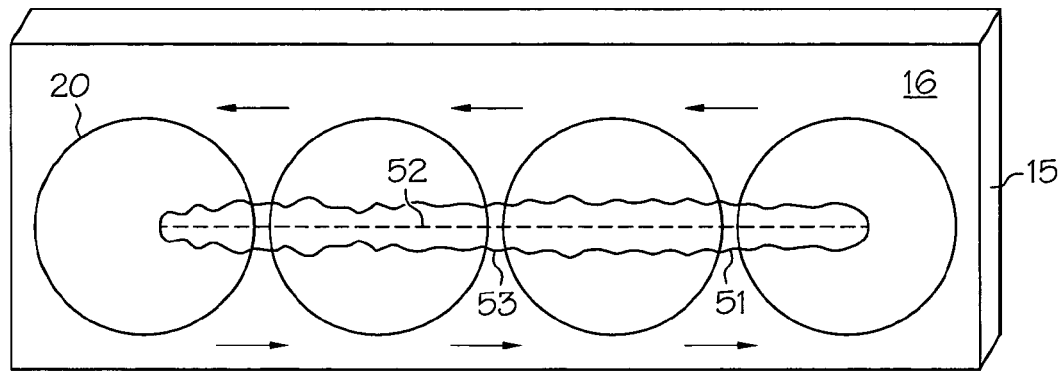
FIG. 5 is top view showing a scan of a defocused laser beam spot over a weld as part of a post-welding heating step according to an embodiment of the present invention.

Referring now to FIG. 5 there is shown a top view of a laser beam spot 40 traversing along a surface of a workpiece having a weld 51 according to a further heat treatment embodiment of the present invention. The heat treatment shown in FIG. 5 corresponds to a post-welding heat treatment that allows the workpiece to gradually cool down from the temperatures reached during welding. A surface of a workpiece is again in the same plane as the page. Weld 51 has been deposited on the workpiece so as to repair a previously existing crack. Weld 51 may be characterized as having an imaginary centerline 52 and edge 53. The circles in FIG. 5 represent laser beam spot 20 as it traverses over the surface of the workpiece. Laser beam spot 20 is projected by a defocused laser beam. The arrows indicate a typical direction of travel of the laser beam spot 20 scanning the surface, though other configurations are possible.

Figure 6:
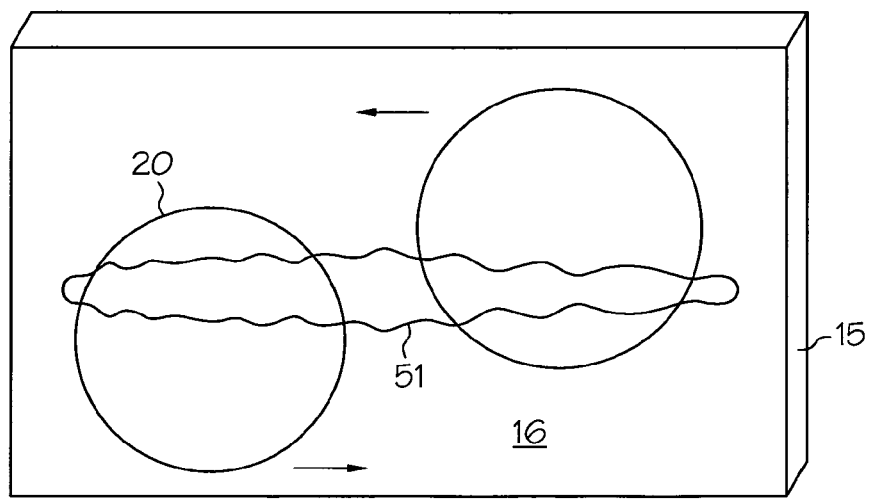
FIG. 6 is a top view showing an area of a defocused laser beam spot scanning over an area of a weld according to an embodiment of the present invention.

Whereas in FIG. 3 the laser beam spot 20 was generally scanned over areas adjacent to a crack, in FIG. 5 the laser beam spot 20 is generally scanned over the recently formed weld 51. Thus a preferred scanning control as shown in FIG. 5 is to scan such that the center point 36 of laser beam spot 5 runs over the centerline 52 of weld 51. Optionally, the scan may be controlled such that the center point 36 runs along the edge 53 of weld. As a further option, the scan may be controlled such that some area of laser beam spot 20 overlies weld 51, as shown in FIG. 6. The purpose of each control method is to provide heat to the area of the weld 51.

The rate of cooling in the post-welding heat treatment is generally slower than the rate of heating in the pre-welding step. In one embodiment, the post-welding heat treatment includes reducing the laser power from approximately 700 watts or less to approximately 0 in approximately 5 minutes or less. In another embodiment, the post-welding heat treatment includes comprises reducing the laser power from approximately 400 watts or less to approximately 0 in approximately 5 minutes or less.

While FIG. 3 and FIG. 5 illustrate laser beam spot 20 in circular form, it is to be appreciated that other geometries are possible. When for example a laser beam is projected at an angle other than normal to the surface of the workpiece, the shape of the laser beam spot on the surface will typically be ellipsoid. Thus the designation of a "spot" is not meant to be limited to strictly circular forms, but is also meant to include other shapes cast by angled laser projections onto the work surface.

The methods of scanning a laser beam spot described above with respect to a circumference or a centerpoint of a laser beam spot also apply to those laser beam spots that are non-circular in shape. The laser beam spot, if non-circular in shape, may be approximated to a circular geometry wherein a theoretical circle has a circumference and centerpoint. The theoretical circle is such that the area of the theoretical circle overlies a central area of the laser beam spot.

The heating and cooling steps when done by hand control are preferably performed so as to allow a generally uniform rate of heat transfer. Additionally, movement is preferably controlled so that each point in the total area to be heated generally heats or cools uniformly without development of significant hot spots. No particular linear velocity of the laser beam spot is required.

As previously mentioned, the pre-welding and post-welding heat treatments are suited for use with laser welding operations. When so used, transitions from pre-welding heating to laser welding and from laser welding to post-welding heating preferably occur rapidly as follows. For the pre-welding heat treatment, the laser generator has been energized so as to provide substantially the same power as will be needed for the laser welding. During the pre-welding heat treatment the power density applied to the workpiece surface is lower, however, from that to be used during the laser welding by positioning the laser beam focal point a desired distance from the workpiece surface. Thus, once heating is completed the focal point is repositioned, preferably by lowering the laser generator. The focal point is positioned typically substantially on the workpiece surface or some point below the workpiece surface. Thus the transition consists of adjusting the position of the laser generator. Other laser systems such as powder feed (or wire feed) and gas flow are also activated. Laser welding is then performed. Once laser welding is completed, the laser systems of powder feed (or wire feed) may be deactivated; gas flow, if desired, may continue in order to protect the weld. The laser generator is then repositioned so as to raise the focal point above the workpiece surface. The ease of transition is advantageous in that it allows quick movement, which is valued in manual laser operations. It is not necessary to deal with ancillary equipment such as heaters in these transition periods.

Figure 7:
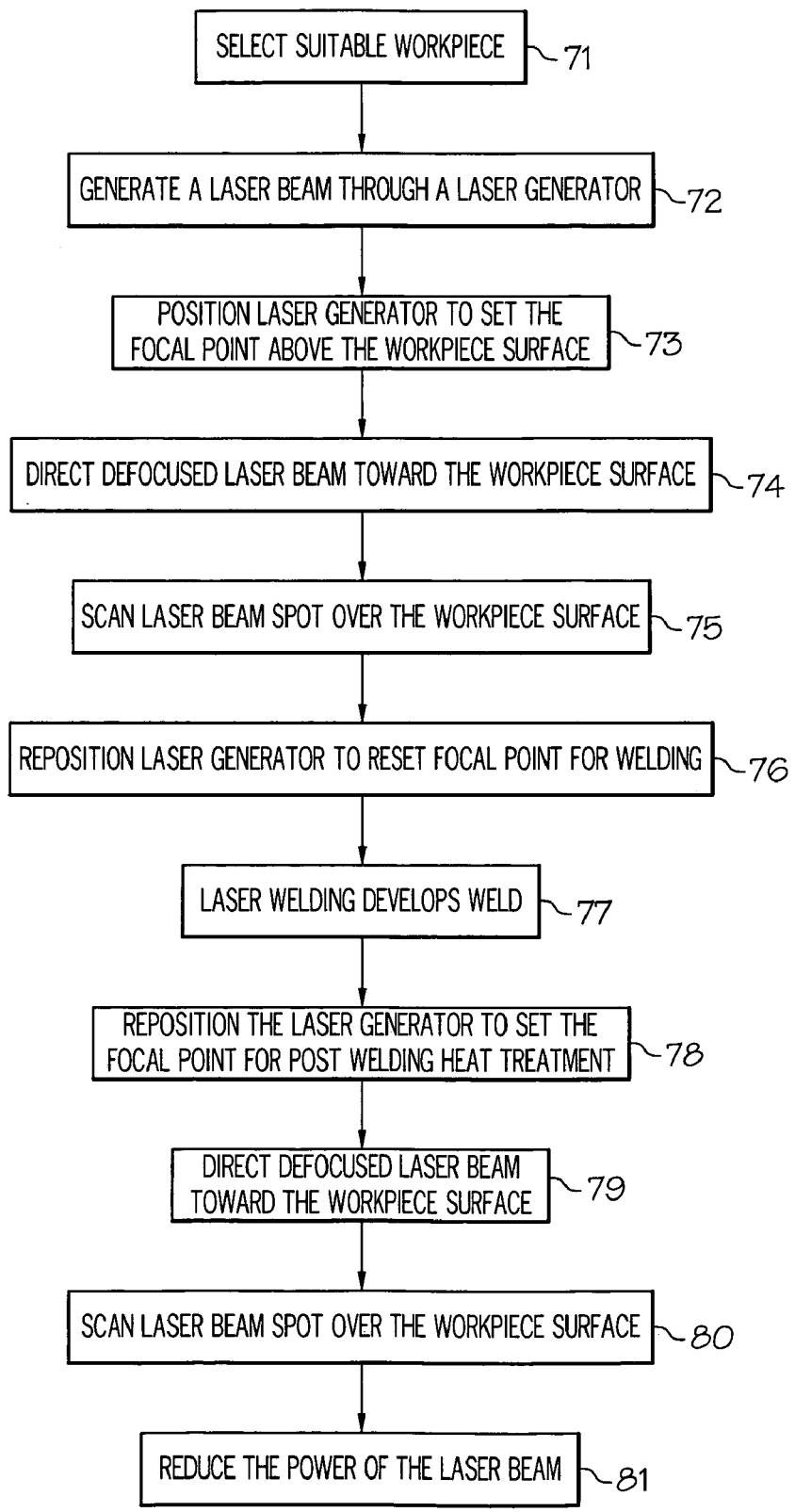
FIG. 7 is a flow chart showing steps in method of laser welding heat treatment according to an embodiment of the present invention.

In operation the above-described steps of heat treatment may be combined with laser welding in a unitary welding operation, the steps of which are shown in FIG. 7. In step 71 a suitable workpiece is first selected. Inspection of the workpiece confirms that the workpiece is a suitable candidate for repair by a laser welding process. The workpiece should not suffer from mechanical defects or other damage that would disqualify it from return to service, other than wear, which can be repaired by the welding method. The workpiece may receive pre-welding treatment such as stripping coatings, pre-welding machining, degreasing and grit blasting in order to remove materials that interfere with laser welding such as oxides, inclusions, impurity buildups, and contamination on the face of the workpiece.

Steps 72 through 75 involve the pre-welding heat treatment process. Step 72 generates a laser beam through a laser generator. The laser beam is characterized as having a focal point. The laser beam also carries a set power. In step 73 the laser generator is positioned such that the focal point of the laser beam is above the workpiece surface. In step 74 a defocused laser beam is directed toward the workpiece surface so as to project a laser beam spot on the workpiece surface. In step 75 the laser beam spot is scanned over the workpiece surface thereby heating the workpiece surface. Where a crack exists on the workpiece, the scanning follows the control described above so as to heat around the crack. This heating achieves what is desired as a pre-welding heat treatment for the workpiece.

There follows steps for the laser welding of the workpiece. In step 76 the laser generator is repositioned. Laser welding takes place 77, and a weld is developed on the workpiece surface in this step.

There now follows steps involved in the post-welding heat treatment. In step 78 the laser generator is repositioned, from the welding position, such that the focal point of the laser beam is above the workpiece surface. In step 79 a defocused laser beam is directed toward the workpiece surface so as to project a laser beam spot on the workpiece surface. In step 80 the laser beam spot is scanned over the workpiece surface. In step 81 the power of the laser beam is reduced while scanning the laser beam spot over the workpiece surface. The repositioning of the laser generator and the reduction of laser power is such that a post-welding heat treatment is provided to the workpiece.

While the laser welding repair methods described herein may be adapted to different materials, they are suited for use in welding superalloy materials. The gamma prime precipitation-strengthened nickel base superalloys are generally described as those which have high strength even at temperatures of 1600° F. or higher. Generally, these superalloys have an ultimate tensile strength of at least 125 Ksi at 1200° F. and at least 100 Ksi at 1600° F., a yield strength at 0.2% offset of at least 100 Ksi at 1200° F. and at least 70 Ksi at 1600° F. and a rupture strength (1000 hour) of at least 25 Ksi at 1600° F. (See, SUPERALLOYS II, edited by Sims, et al., John Wiley & Sons, 1987, pp. 581–86.) Some common superalloys are sold under the trade names INCONEL®, RENE®, and HASTELLOY® superalloys. Additionally, the laser welding repair methods may be advantageously used in restoring worn or cracked gas turbine engine components such as turbine blades, vanes, nozzles, and other parts.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for welding a workpiece surface including a crack having an imaginary centerline, the method comprising the steps of:

generating through a laser generator a laser beam characterized by a power and focal point;

focusing the focal point of the laser beam above the workpiece surface to generate a defocused laser beam spot on the workpiece surface, the defocused laser beam spot characterized by a diameter and a centerpoint;

scanning the laser beam spot over the workpiece surface such that the laser beam spot centerpoint is within a distance normal to the centerline of the workpiece crack of approximately the laser beam spot diameter, thereby heating the workpiece surface so as to provide a pre-welding heat treatment;

refocusing the focal point of the laser beam; and laser welding the workpiece with substantially the same power as in the generating step.

2. The method according to claim 1 wherein the workpiece has an edge, and wherein the step of scanning the laser beam spot further comprises moving the laser beam spot such that the circumference of the laser beam spot tangentially touches the workpiece crack.

3. The method according to claim 1 wherein the laser generator comprises a hand held ND:YAG laser torch.

4. The method according to claim 1 wherein the workpiece surface is characterized by having a heat affected zone, and wherein the step of scanning further comprises scanning the laser beam spot over the surface of the heat affected zone.

5. The method according to claim 1 wherein the step of scanning further comprises scanning the laser beam spot over the workpiece surface thereby heating the workpiece surface to a temperature of between about 1600° F. and about 2000° F.

6. The method according to claim 1 wherein the step of scanning further comprises scanning the laser beam spot over the workpiece surface for up to approximately 2 minutes.

7. The method according to claim 1 wherein the workpiece surface comprises a superalloy.

8. A method of welding a workpiece surface including a crack, the method comprising the steps of:

laser welding the workpiece surface with a laser beam characterized by a power and a focal point so as to develop a weld having a peripheral edge;

positioning the focal point of the laser beam above the workpiece surface thereby developing a defocused laser beam spot on the workpiece surface, the laser beam spot characterized by a diameter and a centerpoint;

directing the defocused laser beam along the workpiece surface such that the centerpoint of the laser beam spot runs along the weld peripheral edge; and reducing the power of the defocused laser beam.

9. The method according to claim 8 wherein the step of reducing the power of the laser beam comprises reducing the power of the laser beam from approximately 700 watts or less to approximately 0 in approximately 5 minutes or less.

10. The method according to claim 8 wherein the laser beam is controlled by a laser generator, and wherein the laser generator comprises a hand held Nd:YAG laser torch.

11. A method of laser welding a workpiece surface including a crack having an imaginary centerline, the method comprising the steps of:

generating through a laser generator a laser beam having a focal point;

focusing the focal point of the laser beam above the workpiece surface to generate a defocused laser beam, spot on the workpiece surface, the defocused laser beam spot characterized by a diameter and a centerpoint;

scanning the laser beam spot over the workpiece surface such that the laser beam spot centerpoint is within a distance normal to the centerline of the workpiece crack of approximately the laser beam spot diameter, thereby heating the workpiece surface;

refocusing the focal point of the laser beam closer to the workpiece surface;

laser welding the workpiece so as to develop a weld;

refocusing the focal point of the laser beam farther from the workpiece surface thereby developing a defocused laser beam;

directing the defocused laser beam toward the workpiece surface so as to project a laser beam spot on the workpiece surface;

scanning the laser beam spot over the weld; and reducing the power of the laser beam while scanning the laser beam spot over the weld.

12. The method according to claim 11 wherein the step of generating through a laser generator a laser beam further comprises generating through a laser generator a laser beam characterized by a power of between about 75 watts and about 400 watts.

13. The method according to claim 11 wherein the workpiece comprises a superalloy.

14. The method according to claim 11 further comprising monitoring the temperature of the workpiece surface through a pyrometer.

15. The method according to claim 11 wherein the laser generator comprises a hand held Nd:YAG laser torch.

16. The method according to claim 11 wherein the step of generating through a laser generator a laser beam further comprises generating through a laser generator a laser beam characterized by a power, and wherein the step of laser welding further comprises laser welding with a laser beam characterized by a power, wherein the power of the laser beam in the generating step is substantially the same power of the laser beam as used in the laser welding step.

* * * * *

UNITED STATES PATENT AND TRADEMARK OFFICE
CERTIFICATE OF CORRECTION

PATENT NO. : 7,094,988 B1 Page 1 of 1
APPLICATION NO. : 11/109129
DATED : August 22, 2006
INVENTOR(S) : Clyde R. Taylor It is certified that error appears in the above-identified patent and that said Letters Patent is hereby corrected as shown below:

Column 10, line 36 Claim 2, "piece has" should be changed to --piece crack has--;
Column 10, line 41 Claim 3, "ND" should be changed to --Nd--;
Column 10, line 50 Claim 5, "1600°F." should be changed to --1600°F--;
Column 11, line 18 Claim 11, "beam," should be changed to --beam--.

Signed and Sealed this

Fifteenth Day of May, 2007

JON W. DUDAS
*Director of the United States Patent and Trademark Office*